United States Patent
Kurata et al.

(10) Patent No.: US 8,722,236 B2
(45) Date of Patent: May 13, 2014

(54) BATTERY

(75) Inventors: Kengo Kurata, Nagano-ken (JP);
Tsutomu Matsui, Nagano-ken (JP);
Soichi Hanafusa, Nagano-ken (JP);
Hideyuki Ishii, Gunma-ken (JP);
Tatsuya Shinoda, Hyogo-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 770 days.

(21) Appl. No.: 12/825,717

(22) Filed: Jun. 29, 2010

(65) Prior Publication Data

US 2011/0052977 A1 Mar. 3, 2011

(30) Foreign Application Priority Data

Aug. 26, 2009 (JP) ................. 2009-195368

(51) Int. Cl.
*H01M 2/02* (2006.01)
*H01M 2/04* (2006.01)
*H01M 2/06* (2006.01)
*H01M 2/08* (2006.01)

(52) U.S. Cl.
USPC ............ 429/178; 429/179; 429/181; 429/183

(58) Field of Classification Search
USPC ................................................ 429/121–347
See application file for complete search history.

(56) References Cited

U.S. PATENT DOCUMENTS

| | | | |
|---|---|---|---|
| 2003/0091897 A1* | 5/2003 | Oogaku et al. | 429/181 |
| 2003/0118902 A1* | 6/2003 | Schubert et al. | 429/174 |
| 2005/0260491 A1* | 11/2005 | Cho | 429/178 |
| 2010/0143786 A1* | 6/2010 | Kim | 429/158 |
| 2010/0227212 A1* | 9/2010 | Kim | 429/158 |
| 2010/0233528 A1* | 9/2010 | Kim et al. | 429/178 |

FOREIGN PATENT DOCUMENTS

| | | |
|---|---|---|
| JP | 11-016548 | 1/1999 |
| JP | 2002-151022 | 5/2002 |
| JP | 2003-272573 | 9/2003 |
| JP | 2009-195367 | 9/2009 |
| JP | 2009-195368 | 9/2009 |

OTHER PUBLICATIONS

"Energizer Max." <http://web.archive.org/web/20080516111051/http://www.energizer.com/products/alkaline-batteries/Pages/alkaline-batteries.aspx>. May 16, 2008. Web.*
U.S. Appl. No. 12/868,424, filed Aug. 25, 2010, Kurata, et al.
Office Action issued Dec. 17, 2013 in Japanese Patent Application No. 2009-195368 (English translation).

* cited by examiner

*Primary Examiner* — Kenneth Douyette
*Assistant Examiner* — James Lee
(74) *Attorney, Agent, or Firm* — Oblon, Spivak, McClelland, Maier & Neustadt, L.L.P.

(57) ABSTRACT

In one embodiment, a battery includes an exterior can, an electrode group, a lid attached to an opening of the exterior can, and anode and cathode terminal portions arranged in the lid. At least one of the terminal portions includes an insulating gasket having a cylindrical portion, an external insulator having a pedestal portion, an external terminal including a head portion and the axial portion extended from the head portion, an electrode lead located in the exterior can and connected to the external terminal, and an internal insulator to isolate the lid and the electrode lead. The cylindrical portion of the external terminal is fixed to a through hole of the lid and an attachment hole of the electrode lead by a caulking. The insulating gasket is formed of a resin in which the melting point is higher than those of the internal insulator and the external insulator.

15 Claims, 4 Drawing Sheets

BATTERY

CROSS-REFERENCE TO RELATED APPLICATION

This application is based upon and claims the benefit of priority from prior Japanese Patent Application No. 2009-195368, filed Aug. 26, 2009, the entire contents of which are incorporated herein by reference.

FIELD

The present invention relates to a battery in which an external electrode terminal is fixed to a lid by caulking so that the external terminal maintains an insulation property and a high air-tightness.

BACKGROUND

In rechargeable secondary batteries used for many kinds of electronic devices, miniaturization and weight saving of the battery have been called for with progress in the electronic devices, such as a cellular phone and a personal computer. A rechargeable lithium-ion battery is represented as the rechargeable battery with high energy density which can meet this demand. On the other hand, the rechargeable batteries, such as a lead storage battery and a nickel-hydride battery are used as the large capacity power supply source for the electronic devices represented by an electro-mobile, a hybrid car, an electric motorbike, and a forklift, etc. However, these days, development toward adoption of the rechargeable lithium-ion battery with high energy density has been advanced actively. In order to respond to it, the development of the rechargeable lithium-ion battery is focused on long life and safety to achieve bigger size and larger capacity.

Large driving electric power is needed as power supply sources of above electronic devices when using the rechargeable lithium-ion battery. Accordingly, a battery pack which accommodates many batteries connected in series or in parallel is used.

Amount of current outputted from each battery becomes large with progress of the largess in size and output capacity. Accordingly, in order to suppress the Joule heat of the external electrode terminal, it is necessary to make a resistance of the external electrode small, which results in indispensable enlargement of the external terminal.

Moreover, the battery external terminals of some batteries are connected in series or parallel by external leads. Therefore, stress may be directly applied to the external leads, which may result in a rotation of the cathode terminal or an anode terminal, and further an external short circuit due to the rotation.

Japanese Patent Application Laid Open Nos. (1) P2003-45403, (2) P2003-115287, (3) P2003-151528, and (4) P2000-113865 disclose batteries in which the external electrode terminal like a positive electrode terminal are fixed to a lid by caulking of a gasket consisting of two portions.

Recently, in order to maintain a high air-tightness even in the operation under high temperature, expensive tetrafluoroetylene-perfluoroalkoxyetylenevinyl-ether copolymers (PFA) of fluoride resin is used for the material of the gasket more often (for example, laid open patent applications (1)-(3)). The gasket becomes large with increase in the external electrode terminal, and the amount of the resin which is used therein increases, which results in a problem of raising the cost of the gasket.

Furthermore, PFA is rather soft among the resin materials, therefore, if the external terminals rotate, the gasket may be destroyed. Consequently, if a head portion of the external terminal contacts with the lid, a risk of a short circuit is accompanied.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A battery according to an exemplary embodiment of the present invention will now be described with reference to the accompanying drawings wherein the same or like reference numerals designate the same or corresponding portions throughout the several views.

According to one embodiment of the invention, a battery includes an exterior can, an electrode group having an anode and a cathode accommodated in the exterior can, and a lid attached to an opening of the exterior can Furthermore, the battery includes anode and cathode terminal portions, at least one of the anode and cathode terminal portions including; a through hole opened in the lib, an insulating gasket having a cylindrical portion inserted in the through hole of the lib, an external insulator arranged in an external surface of the lid and having a pedestal portion, an external terminal having a head portion arranged in the pedestal portion of the external insulator, and an axial portion extending from the head portion and inserted in the cylindrical portion of the insulating gasket, a lead of the same polarity as the external terminal, the lead being arranged in the exterior can and having an attachment hole, and the axial portion of the external terminal being inserted in the attachment hole, and an internal insulator arranged between an inside of the lid and the lead to insulate therebetween, and wherein the axial portion of the external terminal is fixed to the through hole of the lib and the attachment hole of the lead by caulking, and the insulating gasket is formed of a resin in which the melting point is higher than the internal insulator and the external insulator.

Hereafter, the battery according to one embodiment of the present invention will be explained with reference to drawings.

Figure 1:
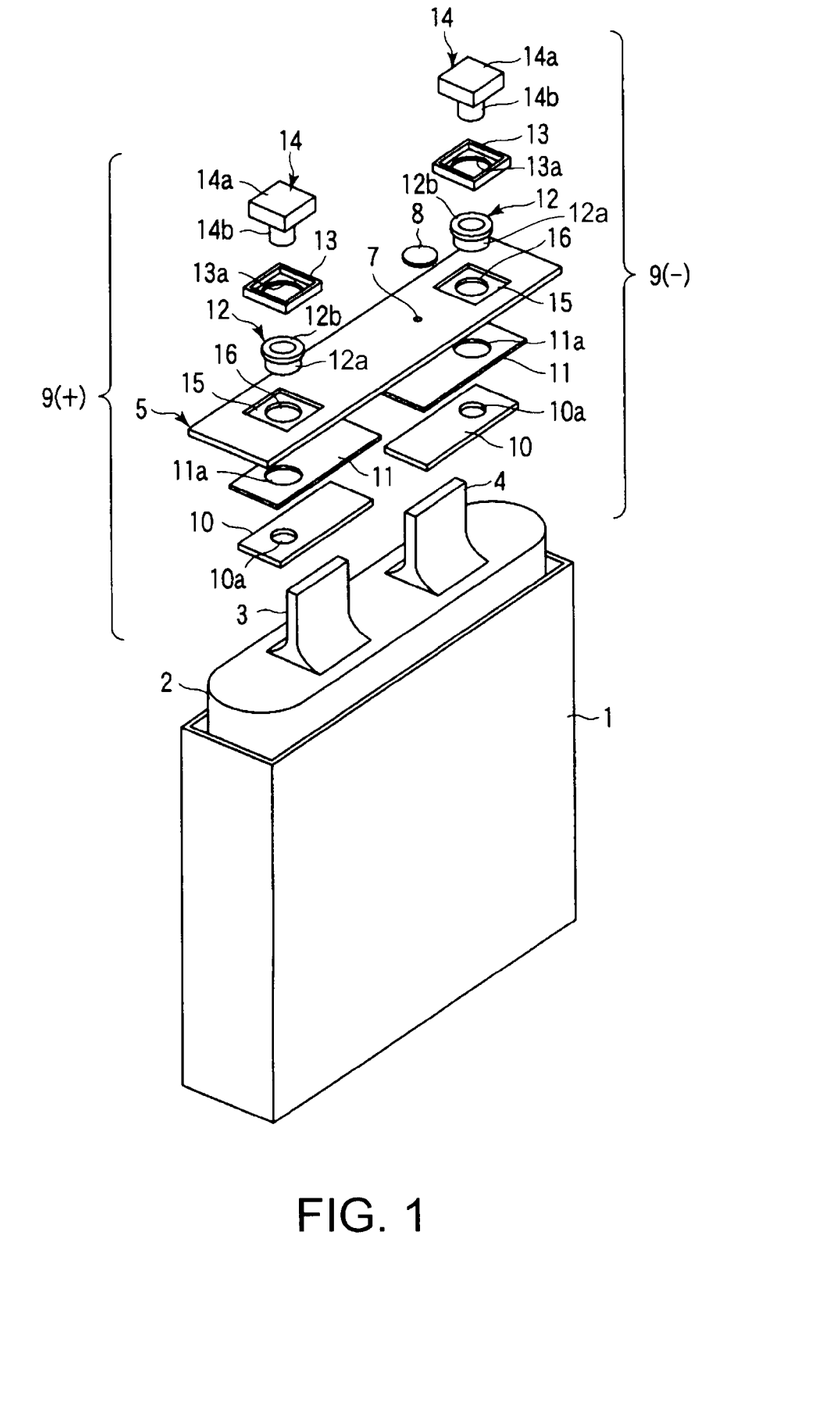
FIG. 1 is an exploded perspective view showing a battery according to an embodiment of the present invention.

The battery shown in FIG. 1 is a closed type secondary battery including a non-aqueous electrolyte and a square-shaped exterior can 1 having a bottom. The exterior can 1 is formed of, for example, metal, such as aluminum, an aluminum alloy, iron, or stainless steel.

An electrode group 2 is formed by firstly sandwiching a separator with a sheet-like anode and cathode, then winding spirally the whole. Furthermore, the spirally wounded electrode group 2 is pressed so as to form a flat shape. The anode (not shown) has a current collector and a positive electrode active material layer laminated on one side or both sides of the current collector. On the other hand, the cathode (not shown) has a current collector and a cathode active material layer laminated on one side or both sides of the current collector. An anode tab 3 is connected to the anode current collector of the electrode group 2 by ultrasonic junction method, and drawn upward from an upper end side of the electrode group 2. Similarly, a cathode tab 4 is connected to the cathode current collector of the electrode group 2 by ultrasonic junction method, and drawn upward from the upper end side of the electrode group 2.

In addition, the anode tab 3 and the cathode tab 4 are not limited to above structure, if electric energy can be taken out from the anode and cathode of the electrode group 2. That is, the respective anode current collector and cathode current collector may be partially extended up-word so as to use as the anode tab 3 and the cathode tab 4. The electrolysis solution (not shown) is impregnated by the electrode group 2.

Figure 2:
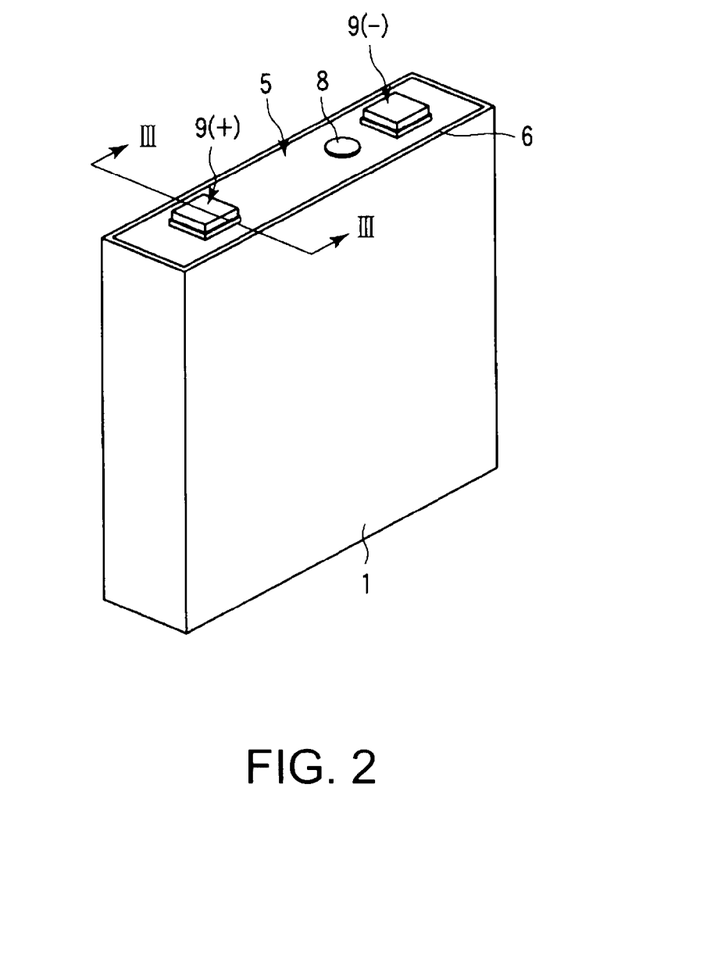
FIG. 2 is a perspective view showing an appearance of the battery shown in FIG. 1.

As shown in FIG. 2, a seam welding of the rectangular board-like lid 5 is carried out to an opening of the exterior can 1 by laser, and the laser welding portion 6 is formed in all the four edges of the lid 5. The lid 5 is formed of metal, for example, such as aluminum, aluminum alloy, iron, or stainless steel. It is preferable to form the lid 5 and the exterior can 1 using the same kind of metal. A pouring opening 7 for an electrolyte is formed in the lid 5, and sealed with a sealing lid 8 after pouring the electrolyte.

As shown in FIG. 1, an anode terminal portion 9 of (+) and a cathode terminal portion 9 of (−) are formed in the lid 5.

The respective anode terminal portion 9 (+) and cathode terminal portion 9 (−) include a lead 10, an internal insulator 11, an insulating gasket 12, an external insulator 13, and an external terminal 14.

Two rectangular-like concave portions 15 are formed in an external surface of the lid 5, and the anode external terminal 14 is accommodated in one concave portion 15, and the cathode external terminal 14 is accommodated in the other concave portion 15 of cathode side. A through-hole 16 is formed in each concave portion 15.

The anode and cathode leads 10 are respectively formed in a rectangular board-like shape with a through-hole 16 for fixing an axial portion of the external terminal 14. Each lead 10 of the anode and cathode is located in the exterior can 1. The anode lead 10 is joined to the anode tab 3 by welding. Similarly, the cathode lead 10 is joined to the cathode tab 4 by welding.

A pair of internal insulators 11 for the anode and the cathode is made in a shape of a rectangular board, and includes through-holes 11a communicated with the through-holes 16 in the lid 5 and through holes 10a in the lead 10, respectively. The anode internal insulator 11 is arranged between the inside of the lid 5 and the anode lead 10 so as to isolate the lid 5 and the lead 10. On the other hand, a cathode internal insulator 11 is arranged between the inside of the lid 5 and the cathode lead 10 so as to insulate the lid 5 and the lead 10.

Figure 3:
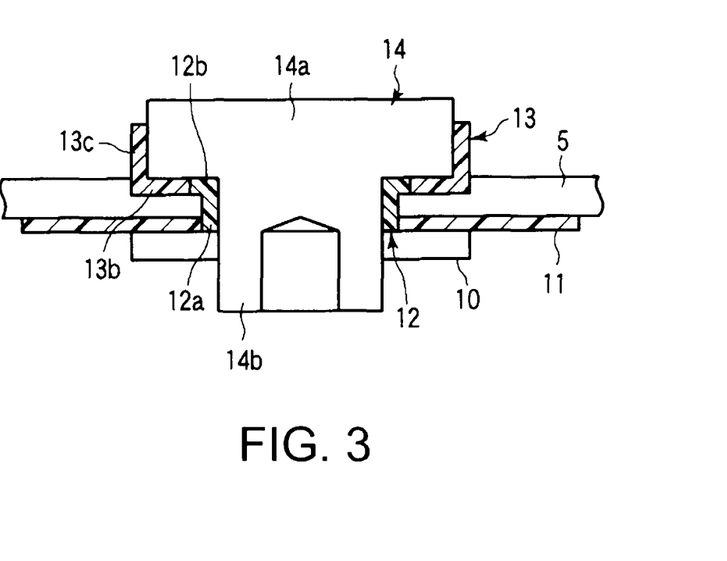
FIG. 3 is a cross-sectional view showing an external electrode terminal taken along line III-III before fixation by caulking.

As shown in FIG. 3, the anode and cathode insulating gaskets 12 respectively include a cylindrical portion 12a and a flange portion 12b formed at an opening end of the cylindrical portion 12a in a sword guard shape. The cylindrical portion 12a of the anode insulating gasket 12 is inserted in the through-hole 16 in the concave portion 15 of the lid 5, and also inserted in the through-hole 11a of the anode internal insulator 11. The flange portion 12b of the insulating gasket 12 covers a periphery of the through-hole 16 in the concave portion 15 of the lid 5. On the other hand, the cylindrical portion 12a of the cathode insulating gasket 12 is inserted in the through-hole 16 in the concave portion 15 of the lid 5, and also inserted in the through-hole 11a of the cathode internal insulator 11. The flange portion 12b of the cathode insulating gasket 12 covers a periphery of the through-hole 16 in the concave portion 15 of the lid 5.

The respective anode and cathode external insulators 13 include a rectangular board-like pedestal portion 13b which has a through-hole 13a and a side wall portion 13c built from a neighborhood of the pedestal portion 13b to the upper portion. The external insulator 13 of the anode is arranged in the concave portion 15 of the lid 5, and the flange portion 12b of the anode insulating gasket 12 is inserted into the through-hole 13a of the anode external insulator 13. On the other hand, the cathode external insulator 13 is arranged in the concave portion 15 of the lid 5, and the flange portion 12b of the cathode insulating gasket 12 is inserted into the through-hole 13a of the cathode external insulator 13.

The respective anode and cathode external terminals 14 include a rectangular-like head 14a and an axial portion 14b extended to a lower portion from the head portion 14a, as shown in FIG. 1. As shown in FIG. 3, the head portion 14a of the anode external terminal 14 is accommodated in a space surrounded by the flange portion 12b of the anode insulating gasket 12, the pedestal portion 13b of the anode external insulator 13 and the side wall portion 13c. The axial portion 14b of the anode external terminal 14 is inserted in the cylindrical portion 12a of the anode insulating gasket 12 and the through-hole 10a of the anode lead 10, and the lower end of the axial portion 14b is projected from the through-hole 10a. On the other hand, the head portion 14a of the cathode external terminal 14 is accommodated in a space surrounded by the flange portion 12b of the cathode insulating gasket 12, the pedestal portion 13b of the cathode external insulator 13, and the side wall portion 13c. The axial portion 14b of the cathode external terminal 14 is inserted in the cylindrical portion 12a of the cathode insulating gasket 12 and the through-hole 10a of the cathode lead 10, and the lower end of the axial portion 14b is projected from the through-hole 10a.

Figure 4:
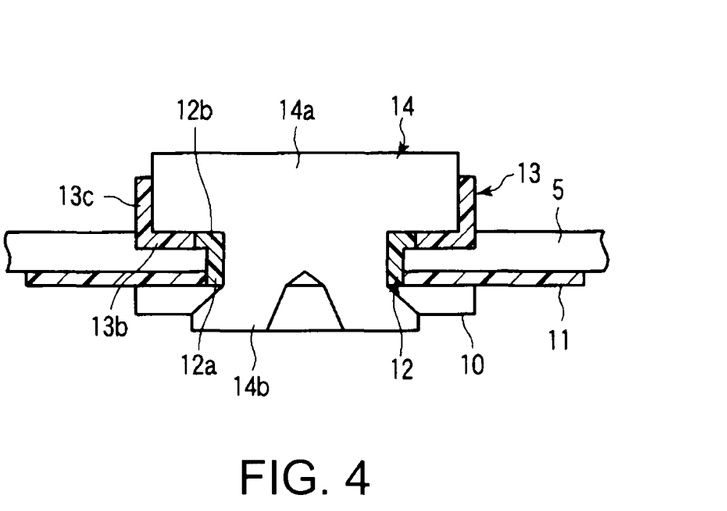
FIG. 4 is a cross-sectional view showing an external electrode terminal taken along line III-III after fixation by caulking.

In the anode and cathode external terminals 14, when the axial portion 14b is pressurized in a direction of the axis while fixing the position of the head portion 14a, as shown in FIG. 4, the axial portion 14b is deformed (expansion deformation). As a result, while the insulating gasket 12 located between the axial portion 14b of the external terminal 14 and the through-hole 16 of the lid 5 is compressed, the insulating gasket 12 sticks with the internal insulator 11 and the external insulator 13 by this compression. Furthermore, the axial portion 14b of the external terminal 14 sticks to the through-hole 10a of the lead 10. That is, the external terminal 14 is fixed to the lid 5 by a caulking of the external insulator 13, the insulating gasket 12, and the internal insulator 11. The external terminal 14 is also fixed to the lead 10 by the caulking. Thereby, the anode and cathode external terminals 14 and the lid 5 are fixed in which insulation and air-tightness are secured. The anode external terminal 14 and the anode lead 10 are also fixed in which an electrical connection is secured. Similarly, the cathode external terminal 14 and the cathode lead 10 are also fixed in which an electrical connection is secured.

Here, with respect to the external insulator 13, the insulating gasket 12, and the internal insulator 11, it is desirable for each to be formed of a molded resin, and all of the three portions are fixed to the lid 5 by caulking of the external terminal 14.

The important element to get the air tightness by fixation using the caulking is the insulating gasket 12. The gasket 12 is formed of molded article using a resin material in which the melting point is higher than the external insulator 13 and the internal insulator 11. Thereby, the air tightness is achieved during operation at a high temperature (for example, 100° C. or less). Moreover, if a harder material for the external insulator 13 is used as compared with the insulating gasket 12, the external insulator 13 can raise mechanical strength, and it becomes possible to achieve a low risk of the short circuit at the time when the external terminal rotates.

Figure 6:
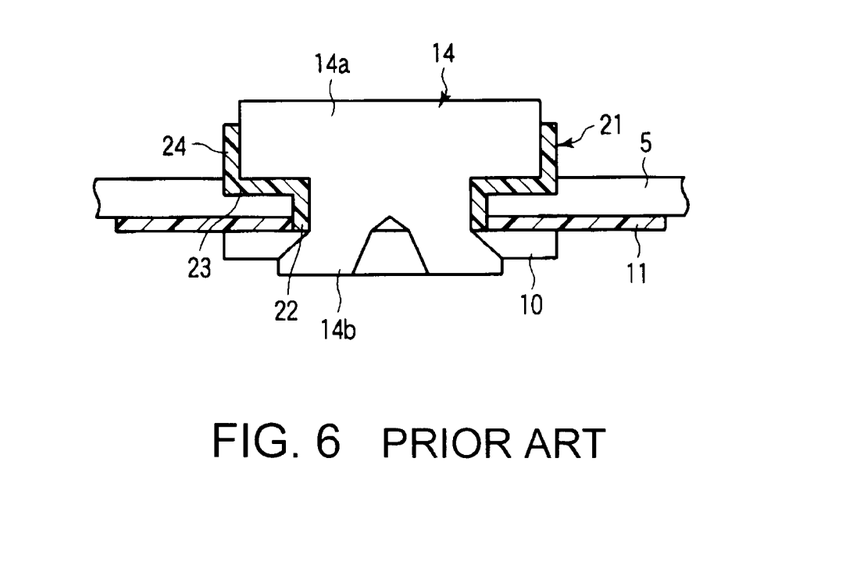
FIG. 6 is a sectional view showing an example of the external terminal structure of a conventional battery.

FIG. 6 shows an external terminal structure of a conventional example which uses two elements like the patent applications mentioned above. A flange portion 23 is formed in one opening end of a cylinder portion 22 of an insulating gasket 21. The flange portion 23 serves as a pedestal of an external terminal head 14a. A side wall portion 24 is built from four edges of the flange portion 23. An opening end of another side of the cylinder portion 22 of the insulating gasket 21 is inserted into a through-hole of an internal insulator 11. By carrying out deformation of an axial portion 14b by caulking from the axis side of the external terminal 14 so as to expand the radius, the space between the external terminal 14 and the lid 5 is lost, and insulation and air-tightness are secured. Similarly, the lid 5 and the lead 10 are fixed so as to secure insulation. Further, an electrical connection is secured between the axial portion 14b of the external terminal 14 and the lead 10.

It is apparent that a little amount of the resin material is used to form the insulating gasket 12 in this embodiment as compared with the insulating gasket 21 shown in FIG. 6. Accordingly, it becomes possible to suppress a cost of material even if an expensive resin material such as PFA is used. Furthermore, since the insulating gasket 12 according to this embodiment can be formed in a small size compared with the conventional insulating gasket 21, it becomes possible to make many gaskets by using a metallic mold simultaneously, which results in raising of the productivity of the gasket, and a cost cut of the gasket.

It is preferable to use a molded article formed of fluoride resin with high melting point as a material for the insulating gasket 12, which is excellent in the tolerance over an electrolysis solution, represented by tetrafluoroetylene-perfluoroalkoxyetylenevinyl-ether copolymers (herein referred as PFA) with the melting point of 300-310° C.

As for PFA, it is preferable for melt flow rate (herein referred as MFR) to be 5 g/10 minutes or less. Thereby, the flow of resin at high temperature is stopped, and further, the air-tightness is improved. MFR is measured under a condition of the temperature: 372° C., and the load: 5 kg.

It is preferable that the thickness of the flange portion 12b of the insulating gasket 12 is larger than that of the pedestal portion 13b of the external insulator 13. Thereby, the flange portion 12b of the insulating gasket 12 which is important for the air tightness is first crushed at the time of caulking. Then, while filling the space between the pedestal portion 13b of the external insulator 13 and the flange portion 12b, the flange portion 12b is fixed between the head portion 14a of the external terminal 14 and the lid 5. Accordingly, the space between the insulating gasket 12 and the external insulator 13 is lost, and it becomes possible to make a structure for preventing the short circuit due to a migration.

Although the resin used for the external insulator 13 is not limited to special one, it is preferable to use a resin with a lower melting point and a harder characteristics than that used in the insulating gasket 12. Practically, it is more preferable that the melting point of the external insulator 13 is lower than that of the insulating gasket 12 and that the Rockwell hardness is larger than that of the insulating gasket 12. Thereby, when torque works toward the external terminal 14a in which the caulking portion becomes a center point of the torque, it becomes possible to avoid destruction of the external insulator 13 by the power applied to the external terminal head 14a and the lid 5. Accordingly, the short circuit due to contact of the external terminal head portion 14a with the lid 5 can be prevented.

Since the Rockwell hardness of PFA is about R50 when using PFA for the insulating gasket 12, following materials having larger Rockwell hardness are used for the external insulator 13a, such as polypropylene (PP) (hardness: R85-110, melting point: 160-170° C.), polyethylene terephthalate (PET) (R110-120, 264° C.), and polyphenylene sulfide (PPS) (R118-124, 280-290° C.). The Rockwell hardness is defined by "plastic—how to get hardness—part II: the Rockwell hardness) of JIS K 7202-2.

Figure 5:
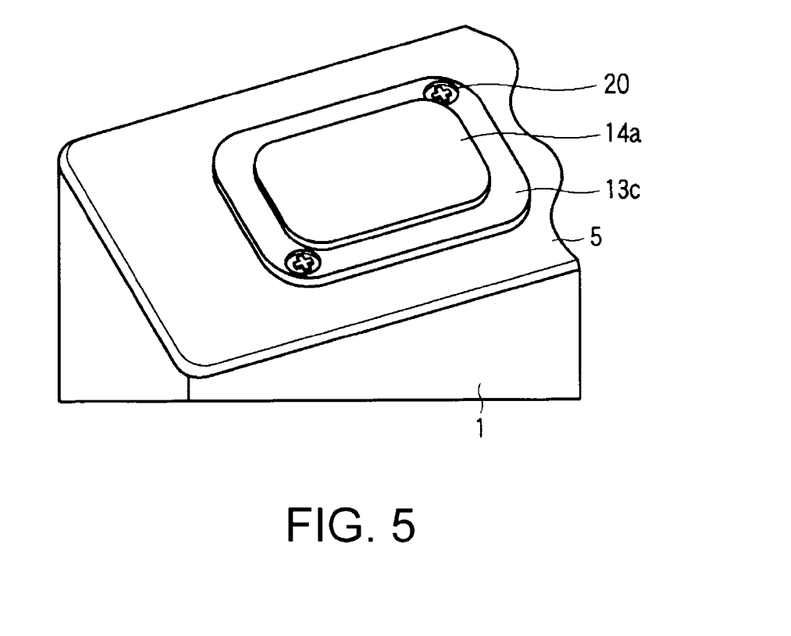
FIG. 5 is an enlarged schematic perspective view showing a main portion of a lid of the battery shown in FIG. 1.

It is preferable that the external insulator 13 is an injection-molded article. In the PFA with MFR less than 5 g/10 minutes, the injection molding is difficult although MFR can secure the air-tightness at high temperature. While a flexibility of changing form increases by using the injection-molded articles for the external insulator 13, it becomes possible to form polar displays of "+" and the "−" mark, etc. or to make the external insulators 13 different colors. Accordingly, it becomes possible to easily distinguish the polarity of each external insulator 13 used for caulking of the anode terminal or the cathode terminal. FIG. 5 shows an example which displays the mark "+" 20 on an upper end side of the side wall portion 13c of the anode external insulator 13. PP, PET, and PPS, etc. are used as resins in which the injection molding is possible.

Although the resin used for the internal insulator 11 is not limited, it is preferable the melting point of the resin is lower than that used for the insulating gasket 12. Moreover, the resin capable of injection molding is desirable because the flexibility of changing the form using the injection molding increases. Specifically, PP, PET and PPS, etc. may be used.

Here, a typical external terminal material is explained. In a case of the rechargeable lithium-ion battery which uses carbon based material for a cathode electrode active material, aluminum or aluminum alloy is generally used for the anode terminal, and metal, such as copper, nickel, and iron coated by the nickel, are used for the cathode terminal. Moreover, when using lithium titanate for the cathode electrode active material, in addition to the above materials, aluminum or aluminum alloy may be used for the cathode terminal.

Although the structure where the external terminals of both anode and cathode are fixed to the lid by caulking is shown in FIG. 1, the cathode external terminal is fixed to the lid by caulking, and the anode lead may be attached to the lid by welding when the exterior can is formed of aluminum or aluminum alloy. Further, when the exterior can is formed of iron or stainless steel, the anode external terminal is fixed to the lid by caulking, and the cathode lead may be directly attached to the lid by welding.

In FIG. 1, although the anode and cathode tabs are pulled out from one end side of the electrode group, the anode tab may be pulled out from one end side of the electrode group, and the cathode tab may be pulled out from the other end side. In this case, the current collectors in which the electrode active materials are removed are respectively exposed to the both end sides of the electrode groups, and each can be used as the anode or cathode tab. In this case, a pair of lids is formed in both end sides of the external can.

Although the flat spiral electrode group is used in FIG. 1, the structure of the electrode group is not limited, and it is possible, for example, to use a laminated type electrode group in which the anode and cathode are laminated by turns while making the separator interposing between the anode and cathode.

Next, the anode, cathode, separator, and electrolyte which are used in FIG. 1 are explained.

The anode is formed, for example, by coating slurry containing an anode electrode active material on a surface of a current collector which consists of aluminum foil or aluminum alloy foil. Especially, as anode electrode active material, although not limited, an oxide, a sulfide and a polymer, etc. which can carry out occlusion and release of the lithium can be used. A lithium manganese compound oxide, a lithium nickel compound oxide, a lithium cobalt compound oxide and lithium phosphoric acid iron, etc., in which high anode potential is obtained, are used as preferable anode electrode active materials. Moreover, the cathode is produced by coating the slurry containing a cathode electrode active material on a surface of the current collector which consists of aluminum foil or aluminum alloy foil. Especially, as cathode electrode active materials, although not limited, a metal oxide, a metal sulfide, a metal nitride, an alloy, etc., which can carry out occlusion and release of the lithium, can be used, and in which the occlusion discharge potential of lithium ion is preferably larger than 0.4V with respect to the metallic lithium potential. Since the cathode active material which has such lithium ion occlusion-release potential can suppress alloy reaction of aluminum or aluminum alloy with lithium, it makes possible to use aluminum or aluminum alloy as the current collector for the cathode and cathode related components. For example, as cathode active materials, following materials, such as a titanium oxide, a lithium titanium oxide, a tungsten oxide, an amorphous tin oxide, a tin silicon oxide, and a silicon oxide, etc. are used. A lithium titanium compound oxide is especially preferable. As a separator, a lamination of the same materials or different materials can be used among films with fine porosity, textiles, and nonwoven fabrics. As a material which forms a separator, polyethylene, polypropylene, ethylene-propylene copolymerization polymer, and ethylene-butene copolymerization polymer, etc. can be used.

A non-aqueous electrolysis solution prepared by dissolving an electrolyte (for example, lithium salt) in a non-aqueous solvent is used as an electrolyte. As a no-aqueous solvent, for example, ethylene carbonate (EC), propylene carbonate (PC), butylene carbonate (BC), dimethle carbonate (DMC), dietyle carbonate (DEC), ethyl methyl carbonate (EMC), gamma-butyro lactone (γ-BL), sulfolane, acetonitrile, 1,2-dimethoxy ethane, 1,3-dimethoxy propane, dimethyl ether, a tetra-hydro franc (THF), and a 2-methyl tetra-hydro franc, etc. can be used. The non-aqueous solvent may be used independently, or two or more solvents may be mixed. As an electrolyte, lithium salts such as lithium perchlorate ($LiClO_4$), 6 fluoridation perphosphoric acid lithium ($LiPF_6$), 4 fluoridation-lithium-borate ($LiBF_4$), 6 fluoridation-arsenic lithium ($LiAsF_6$), and trifluoro-meta-sulfonic acid lithium ($LiCF_3SO_3$), can be used. The electrolyte may be used independently, or two or more electrolyte may be mixed. As for the electrolyte amount of dissolutions to an electrolytic non-aqueous solvent, it is preferable to set the amount to 0.2 mol/L-3 mol/L.

Hereafter, practical embodiments of the present invention is described in detail.

Embodiment 1

PP was used as the resin material of the external insulator 13 and the internal insulator 11, and PFA with MFR of 2 g/10 minutes (brand name AP-230 by Daikin Industries, LTD.) was used for the insulating gasket 12. An aluminum alloy was used for the external terminal 14 and the lid 5. As shown in FIG. 4, the lid 5 after performing the caulking was produced for a test sample.

Embodiment 2

The lid 5 was produced like the embodiment 1 except PFA with MFR of 25 g/10 minutes (brand name AP-201SH by Daikin Industries, LTD.) for the insulating gasket 12.

A helium leak test was done to the lids produced by the above conditions of the embodiments 1 and 2. The external terminal head prepared in each lid was turned down, and held by a supporting member. The lid, the supporting member and a container forms a closed container. A helium leak detector was worked, while vacuuming the inside of the closed container, and helium leak detection was carried out. Helium gas was sprayed on the connecting portion of the axial portion of the external terminal with the lead, and the amount of helium gas which permeated into the closed container of a vacuum state was measured. The test was made for five pieces about each embodiment, and the average of the measured result is shown in the following table 1.

Again, the lids of the embodiments 1 and 2 are tested using the lids which have been left in a constant temperature bath of 130° C., and then left at room temperature for 1-hour after taken out from the bath. The helium leak test was carried out in a similar manner to above case. The test was made for five pieces about each embodiment, and the average of the measured result is shown in the following table 1.

TABLE 1

| | MFR of PFR | Before leaving at 130° C. He: leaked amount (Pa · m³/sec.) | After leaving at 130° C. He: leaked amount (Pa · m³/sec.) |
|---|---|---|---|
| EMB. 1 | 2 g/10 min. | Less $1 \times 10^{-10}$ | Less $1 \times 10^{-10}$ |
| EMB. 2 | 25 g/10 min. | Less $1 \times 10^{-10}$ | More $1 \times 10^{-8}$ |

As apparent from the table 1, the helium leak was not detected from the lid according to the embodiment 1 in which the gasket uses PFA with MFR (less 5 g/PFA for 10 minutes). This means that there is no air-tightness degradation even if the caulking portion is left in a high temperature environment of 130° C.

Moreover, each airtightness of embodiments 1 and 2 was compared with that of the lid of the conventional structure shown in FIG. 6 mentioned above. In the embodiment 1, almost the equal air-tightness was obtained to that of example 1, in which the lid uses the gasket 21 and the internal insulator 11 shown in FIG. 6 with PFA of the same MFR value as the embodiment 1. Similarly, in the embodiment 2, almost the equal air-tightness was also obtained to that of example 2, in which the lid uses the gasket 21 and the internal insulator 11 shown in FIG. 6 with PFA of the same MFR value as the embodiment 2. In the embodiment, the resin molded article used for caulking is constituted by three components of the external insulator, the insulating gasket, and the internal insulator. Further, a resin material with a higher melting point than the external insulator and the internal insulator is used for the insulating gasket. Therefore, according to the embodiments, the equal air-tightness can be acquired to the case in which a resin material with a high melting point is used for the gasket 21 and the internal insulator 11 like the conventional structure. Furthermore, it is possible to suppress the increase in the component cost, and also to avoid the possibility of a short circuit, while securing the air-tightness by using a resin material harder than the insulating gasket for the external insulator.

According to the embodiments of the present invention, the use of an expensive resin material for the insulating portions is suppressed while securing the air-tightness in a high temperature environment during the operation even if the external terminal is enlarged as stated above. Further, a battery with high safety and reliability which can lessen the risk of the short circuit at the time of the rotation of the external terminal can be offered.

While certain embodiments have been described, these embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural elements disclosed in the embodiments. Furthermore, structural elements in different embodiments may properly be combined. The accompanying claims and their equivalents are intended to cover such forms or modifications as would fall with the scope and spirit of the inventions.

What is claimed is:

1. A battery having an exterior can, an electrode group including an anode and a cathode accommodated in the exterior can, and a lid attached to an opening of the exterior can, comprising:
    anode and cathode terminal portions, at least one of the anode and cathode terminal portions including;
    a depressed portion formed in the lid,
    a through hole opened in the depressed portion of the lid,
    an external insulator arranged in the depressed portion of the lid and provided with a pedestal portion surrounding the through hole and having a side wall,
    an insulating gasket having a cylindrical portion inserted in the through hole of the lid and a flange portion formed on a portion of the depressed portion of the lid at a periphery of the through hole,
    an external terminal having a head portion and an axial portion extending from the head portion and inserted in the cylindrical portion of the insulating gasket, the head portion being accommodated in a space surrounded by the flange portion of the insulating gasket and the pedestal portion and the side wall of the external insulator,
    a lead of the same polarity as the external terminal, the lead being arranged inside the exterior can and having an attachment hole, and the axial portion of the external terminal being inserted in the attachment hole, and
    an internal insulator arranged between an inside of the lid and the lead to insulate therebetween, and
    wherein the axial portion of the external terminal is fixed to the through hole of the lid and the attachment hole of the lead by caulking, and the insulating gasket is formed of a resin in which the melting point is higher than the internal insulator and the external insulator.

2. The battery according to claim 1, wherein the Rockwell hardness of the external insulator is larger than that of the insulating gasket.

3. The battery according to claim 1, wherein the thickness of the flange portion of the insulating gasket is larger than that of the pedestal portion of the external insulator.

4. The battery according to claim 1, wherein the insulating gasket is formed of tetrafluoroethylene-perfluoroalkoxyetylenevinyl-ether copolymers (PFA).

5. The battery according to claim 4, wherein the melt flow rate of the tetrafluoroethylene-perfluoroalkoxyetylenevinyl-ether copolymers (PFA) is less or equal to 5 g/10 minutes.

6. The battery according to claim 1, wherein the respective anode and cathode terminal portions include external insulators, and at least one of the external insulators of the terminal portions displays its polarity.

7. The battery according to claim 1, wherein the respective anode and cathode terminal portions include external insulators, and a color of the external insulator of the anode terminal is different from that of the external insulator of the cathode.

8. The battery according to claim 1, wherein the battery is a closed type rectangular secondary battery, and the external can is formed of a metal selected from the group consisting of aluminum, aluminum alloy, iron, and stainless steel in a shape of rectangle having a bottom.

9. The battery according to claim 1, wherein the external insulator, the insulating gasket, and the internal insulator are respectively formed of molded resin.

10. A battery having an exterior can, an electrode group including an anode and a cathode accommodated in the exterior can, and a lid attached to an opening of the exterior can, comprising:
    anode and cathode terminal portions provided in both ends of the lid apart from each other, and at least one of the terminal portions including;
    a depressed portion formed in the lid,
    a through hole opened in the depressed portion of the lid,
    an external insulator arranged in the depressed portion of the lid and provided with a pedestal portion surrounding the through hole and having a side wall,
    an insulating gasket having a cylindrical portion inserted in the through hole of the lid and a flange portion formed on a portion of the depressed portion of the lid at a periphery of the through hole,
    an external terminal having a head portion and an axial portion extending from the head portion and inserted in the cylindrical portion of the insulating gasket, the head portion being accommodated in a space surrounded by the flange portion of the insulating gasket and the pedestal portion and the side wall of the external insulator,
    a lead of the same polarity as the external terminal, the lead being arranged inside the exterior can and having an attachment hole, and the axial portion of the external terminal being inserted in the attachment hole, and
    an internal insulator arranged between an inside of the lid and the lead to insulate therebetween, and
    wherein the axial portion of the external terminal is fixed to the through hole of the lid and the attachment hole of the lead by caulking, and the insulating gasket is formed of a resin in which the melting point is higher than the internal insulator and the external insulator.

11. The battery according to claim 10, wherein the Rockwell hardness of the external insulator is larger than that of the insulating gasket, and the thickness of the flange portion is larger than that of the pedestal portion of the external insulator.

12. The battery according to claim 10, wherein the battery is a closed type rectangular secondary battery, and the external can is formed of a metal selected from the group consisting of an aluminum, an aluminum alloy, an iron, and a stainless steel.

13. A battery having an exterior can, an electrode group including an anode and a cathode accommodated in the exterior can, and a first lid and a second lid attached to openings formed at opposed both ends of the exterior can, comprising:

anode and cathode terminal portions arranged in the first and second lids respectively, at least one of the anode and cathode terminal portions including;

a depressed portion formed in the first lid, a through hole opened in the depressed portion of the first lid, an external insulator arranged in the depressed portion of the first lid and provided with a pedestal portion surrounding the through hole and having a side wall, an insulating gasket having a cylindrical portion inserted in the through hole of the first lid and a flange portion formed on a portion of the depressed portion of the first lid at a periphery of the through hole, an external terminal having a head portion and an axial portion extending from the head portion and inserted in the cylindrical portion of the insulating gasket, the head portion being accommodated in a space surrounded by the flange portion of the insulating gasket and the pedestal portion and the side wall of the external insulator, a lead of the same polarity as the external terminal, the lead being arranged in the exterior can and having an attachment hole, and the axial portion of the external terminal being inserted in the attachment hole, and an internal insulator arranged between an inside of the first lid and the lead to insulate therebetween, and wherein the axial portion of the external terminal is fixed to the through hole of the first lid and the attachment hole of the lead by caulking, and the insulating gasket is formed of a resin in which the melting point is higher than the internal insulator and the external insulator.

14. The battery according to claim 13, wherein the Rockwell hardness of the external insulator is larger than that of the insulating gasket, and the thickness of the flange portion is larger than that of the pedestal portion of the external insulator.

15. The battery according to claim 13, wherein the battery is a closed type rectangular secondary battery, and the external can is formed of a metal selected from the group consisting of an aluminum, an aluminum alloy, an iron, and a stainless steel.

* * * * *